Dec. 23, 1924.   1,520,339
G. E. ESCHER
MEASURING APPARATUS
Filed July 11, 1923   2 Sheets-Sheet 1
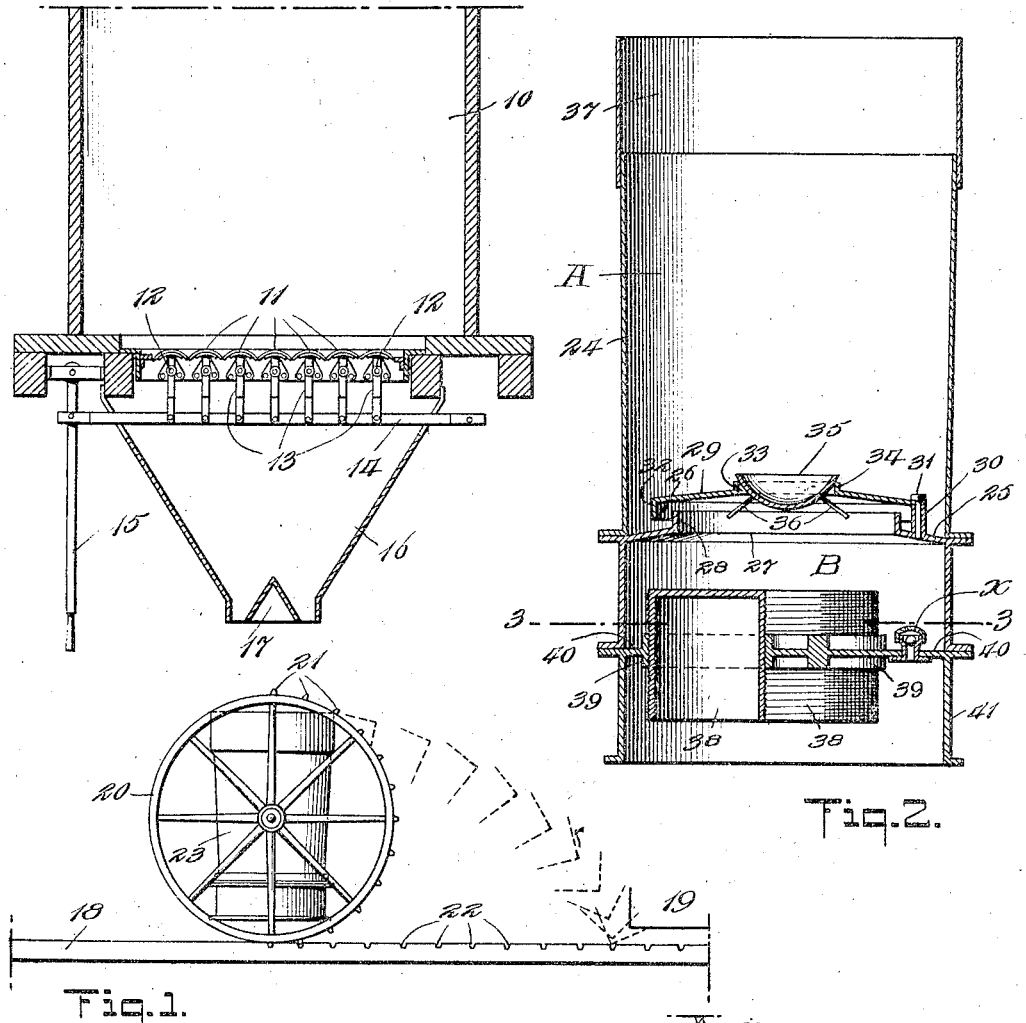
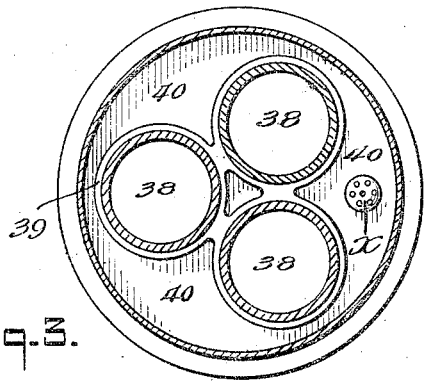
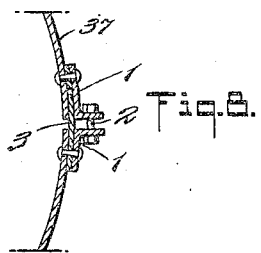
INVENTOR
Gustav E. Escher
BY
ATTORNEY

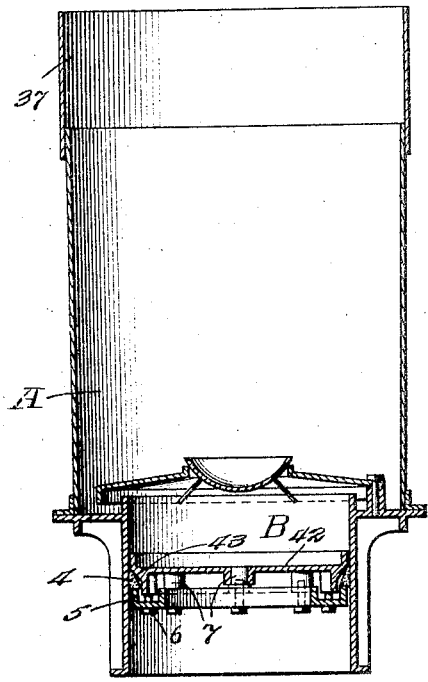
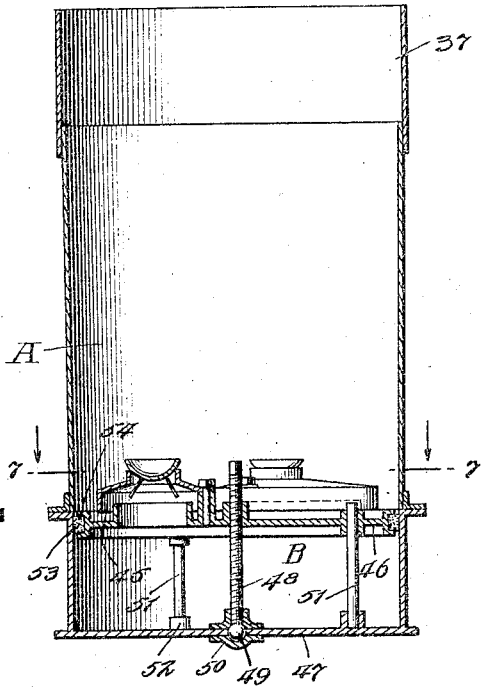
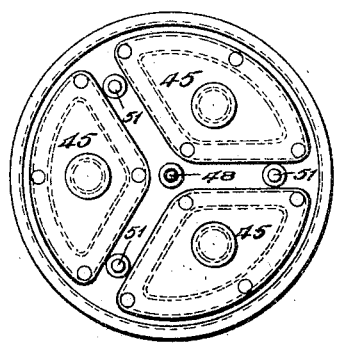
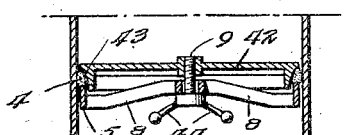

Patented Dec. 23, 1924.

1,520,339

UNITED STATES PATENT OFFICE.

GUSTAV E. ESCHER, OF SUMMIT, NEW JERSEY.

MEASURING APPARATUS.

Application filed July 11, 1923. Serial No. 650,935.

*To all whom it may concern:*

Be it known that I, GUSTAV E. ESCHER, a citizen of the United States, residing at Summit, county of Union, and State of New Jersey, have invented certain new and useful Improvements in Measuring Apparatus, fully described and represented in the following specification and the accompanying drawings forming a part of the same.

This invention relates to improvements in measuring apparatus and especially to apparatus for measuring a plurality of substances simultaneously in the same measure.

In the formation of concrete, each mix is composed of sand, stone, cement and water mixed in certain proportions. The main objection to the use of concrete as a building material lies in its variation in compressive strength due to the impossibility, in regular practice, of producing it in a succession of mixes with a reasonable approach to uniformity of strength. Among other things, the strength depends upon the relative quantities of sand and water forming a portion of each mix. In practice, the sand is very seldom dry, and its bulk varies with its unknown moisture content, whereby it has heretofore been impossible to supply it in uniformly measured quantities, and due to this variable unknown moisture content, the amount of water provided for each mix has also been variable. I now, therefore, propose to measure the sand by inundation, as set forth in my application Serial No. 536,803 filed February 15, 1922, whereby a substantially uniform measure of sand is provided for each mix and since the moisture content of the thoroughly saturated sand is known, it is only necessary to add to each mix the amount of water necessary to form the complete required amount.

The especial object of the present invention is to provide a simple and efficient measure which will provide substantially uniform amounts of sand and water for each mix, and preferably so constructed that the measured water may be utilized as a washing agent for the measure to assure the complete discharge of the sand.

Further objects of the invention relate to the provision of suitable means for delivering the sand to be measured, emptying the measure, and adjusting the measure for the relative quantities of sand and water to be measured.

For a full understanding of the invention, a detailed description of the invention in its preferred forms will now be given in connection with the accompanying drawings forming a part of this specification, and the features forming the invention then specifically pointed out in the claims.

Referring to the drawings—

Fig. 1 is a side elevation, partly in section, of the complete apparatus;

Fig. 2 is a vertical sectional view of the measure;

Fig. 3 is a section on line 3—3 of Fig. 2;

Fig. 4 is a vertical sectional view of a modified form of the invention;

Fig. 5 is a sectional detail of a modified form of securing means for the measure bottom;

Fig. 6 is a vertical section of a further modification of the invention;

Fig. 7 is a section on line 7—7 of Fig. 6; and,

Fig. 8 is a detail view of the method of securing the sand chamber adjustment means.

Referring now to the drawings, the discharge from sand storage bin 10, which may have vertical or downwardly flaring sides, is controlled by a plurality of segmental plates 11, the convex sides of which form a closed bottom for the bin. These segmental plates 11 are supported by pivots 12 mounted on the bin and are provided with arms 13 pivoted to a common operating rod 14 whereby the plates 11 may be moved simultaneously by means of a crank operated by power or by handle 15 operated by hand. A discharge hopper 16 is provided below the bottom of the bin 10 and the sand passing therethrough is preferably distributed by a cone-shaped spreader 17 secured therein.

Below the storage bin 10 are arranged suitable tracks 18, or a platform may be used, extending up to or slightly beyond a chute 19 for the mixer, not shown, and supporting two large wheels 20 provided with teeth or sprockets 21 registering with suitable holes or cuts 22 in the tracks 18, or the platform, as the case may be. The wheels 20 are secured to a measure 23 in such a manner that the wheels and measure rotate as a unit and preferably at such a point relative to the center of gravity of the measure 23 that when the measure 23 is full, the center of gravity of the measure will be above and at one side of the axis of rotation of the bucket 23 and the wheels 20, whereby the bucket will move automatically from its loading position to its position of discharge above the chute 19; the distance between these two positions being equal to about one half the development of the wheels 20. Upon the complete emptying of the measure 23 the center of gravity will shift relative to the axis of rotation to a point above and on the opposite side of the axis of rotation whereby the measure 23 will return automatically to its loading position below the storage bin 10. Suitable stops or other means may be provided for the purpose of limiting the movement of the measure desired.

The measure 23 comprises a casing 24, preferably tubular or frustro-conical in shape, which is divided by suitable partition means, comprising partition 25 and bell 29, into a chamber A, for the measurement of sand, and a chamber B, for measuring water. Suitable interception means, forming part of the partition means allows the water to pass between the chambers A and B but prohibits the passage of sand to chamber B. This interception means may be of any desired form as by the use of compound screens or a suitably valved opening, but in the present instance is shown as a sand trap 26. In the construction shown in Figure 2 the partition 25 is provided with a large central opening 27 and the inner edge of the partition 25 is preferably upturned to provide an annular flange 28 about the opening 27.

The sand trap 26 is formed by supporting the bell 29 on a plurality of spacing sleeves 30 about screw bolts 31 by which the bell is secured to the partition 25, in capped relation to the flange 28 and providing the bell 29 with an annular flange 32 extending downwardly between the flange 28 and the casing 24 within sand chamber A, the lower end of the bell flange 32 being considerably below the upper end of the partition flange 28 so that the lower end of flange 32 will prevent sand rising above the upper end of the flange 28 and entering water chamber B. In order to allow the escape of entrapped air from the water chamber B during the filling of the measure, and also to reduce the time required for the discharge of the water when the measure 23 is being emptied, I preferably provide the bell 29 with a central aperture 33 which may be provided with an annular flange 34 thereabout, upon which seats a suitable, light, loose-fitting valve 35 to prevent the sand from entering water chamber B. The valve 35 is preferably formed in the shape of a segment of a sphere to provide for proper seating against flange 34 and is provided on its lower side with a plurality of prongs 36 which engage the sides of the aperture 33 during the discharge of material from the measure 23 to retain the valve 35 within the measure 23 and in position to return to its seat against the flange 34 when the measure is returned to its normal position for receiving material to be measured.

The capacities of chambers A and B are adjustable through suitable adjusting means provided for each chamber. The means for adjusting the sand chamber A comprises a sliding collar 37 secured in any suitable manner upon the upper end of the chamber A and forming an adjustable extension thereon. As shown in Figure 8 the collar 37 is slit throughout its length and tightened upon the upper end of chamber A by two or more pairs of angle plates 1, secured upon opposite sides of the slit portion of collar 37 and drawn together by bolts 2. Leakage through the slit portion of collar 37 is prevented by the provision of a closure plate 3 overlapping the edges of the slit throughout its length and preferably secured at one side thereof as by the angle plates 1 on the same side of the slit.

The adjustment of water chamber B is obtained by screwing one or more plungers 38 into or out of the water chamber B. To this end the plungers 38 are externally threaded for engagement with threaded flanges 39 forming the edges of openings provided in the bottom plate 40 of chamber B. The plungers 38 are preferably closed at their upper ends and may be screwed into or out of chamber B in any desirable manner as by the use of a key engaging with slots arranged in the lower end of each plunger 38. A suitable skirt 41 forming an extension of the casing 24 at its lower end may be used to protect the threads of the plungers 38 from damage.

The operation of the device is as follows—

Water is introduced into the measure 23 by any suitable means, not shown, until the water chamber B is completely filled and sand chamber A to the requisite percentage of its capacity, which is not less than the percentage of the interstitial space in a given measure of sand. The handle 15 is now moved to cause the separation of segmental plates 11 for discharge of sand from storage bin 10 to hopper 16 and measure 23 whereby the sand is inundated thus assuring a uniform quantity of sand for each mix. As the chamber A fills, the water level moves upward therein and when it is completely filled with sand a certain quantity of water will overflow, this quantity representing the amount of water carried by the sand prior to its delivery to the chamber A as well as any excess originally filled into chamber A. In practice it is advisable to have some excess over the amount necessary to fill the voids in the sand, in order to be sure to have enough.

As previously described, upon the complete filling of the measure 23 the center of gravity thereof is shifted to such a position relative to the axis of rotation of the measure and its wheels that the device automatically moves to its position of discharge into mixer chute 19. During the emptying of the measure 23 a portion of the water passes through the sand trap 26, removing any sand therein and washing the walls of the chamber to assure complete delivery of the sand measured. At the same time the valve 35 opens to reduce the time required for the discharge of the water. When empty the center of gravity is shifted back to such a position relative to the axis of rotation of the measure and its wheels that the device automatically moves back to its measuring position beneath the storage bin 10.

In the modification shown in Figure 4 a different means is shown for adjusting the capacity of the water chamber B. In this construction the entire bottom 42 of the chamber B is movable along the axis of the chamber B and is secured in the desired position by suitable means now to be described. The bottom 42 is provided with a peripheral wedge-shaped groove 43 for the reception of a plastic packing 4, of rubber or any other suitable material, which is compressed tightly against the wall of the chamber B by the action of a clamping ring 5 forced thereagainst by a plurality of bolts 6 secured in suitably threaded projections 7 carried by the exterior side of the bottom 42. The packing 4 serves the double purpose of sealing the bottom 42 with respect to water chamber B and holding it securely in the desired position.

Figure 5 shows a variation of the securing means for the adjustable bottom 42 for chamber B shown in Figure 4. In this construction the clamping ring 5 compresses the packing 4 within the wedge-shaped groove 43 due to the action of a plurality of spider arms 8 forced upward by a suitable bolt 9 screw-threaded into the bottom 42 of chamber B and preferably provided with arms 44 for convenience in tightening.

In the modification shown in Figures 6 and 7 a plurality of sand traps 45 are provided, which are preferably sector like in shape as shown, but may be circular or of any other desired shape. The structure of each of the sand traps 45 is the same as that of the single sand trap 26 shown in Figure 2 and described in connection therewith. For adjusting the capacities of the chambers A and B in this construction, the bottom 47 of chamber B is fixed and preferably formed integrally with the walls thereof; and the partition 46 is made vertically adjustable. To this end the partition 46 is supported by a bolt 48 passing through the partition 46 in screw-threaded relation thereto and supported on the bottom 47 in any suitable manner as by ball head 49 on bolt 48 and socket 50 formed in the bottom 47. Suitable rods 51, rigidly secured in sockets 52 carried by the bottom 47, may be provided to guide the movement of the adjustable partition 46, and a suitable loose, elastic packing ring 53 is provided within a peripheral groove 54 formed in the edge of the partition 46 to prevent the passage of sand to chamber B. In using the above adjusting means, the capacity of water chambed B is first regulated by turning the screw bolt 48 and then the capacity of the sand chamber A is regulated by securing the collar 37 in the desired position.

An air inlet valve, suitable for breaking the vacuum in water chamber B during emptying may be applied to the bottom of chamber B if desired, as shown at $x$ in Fig. 2.

The use of the segmental plate bottom for storage bin 10 is very advantageous to prevent arching of the sand and operates equally well with dry, damp or wet sand. In fact, under certain conditions, it may prove of advantage in reducing the time required for the sand to absorb all the water needed for inundation, to prewet the sand either within or before delivery to the storage bin 10. Prewetting will have the further advantage of reducing the possibility of formation of lumps of sand in the measure, the inside of which might remain dry unless agitated.

It will be understood that the invention is not to be limited to the specific constructions shown, as many modifications may be made within the invention as defined by the claims.

What I claim is:

1. A measuring device for measuring sand or the like in an inundated condition, for the manufacture of concrete, and for simultaneously measuring the additional water required with such sand, which comprises a casing, a partition dividing the casing into two chambers, the upper of which is of such sizes as to measure the required amount of sand in an inundated condition, the lower of the two chambers being of such size as to measure the additional water which is to be used with the sand measured by the upper chamber; and means for allowing water to pass from the upper to the lower chamber and for preventing the admission of sand from the upper to the lower chamber.

2. A measuring device for measuring sand or the like in an inundated condition for the manufacture of concrete, and for simultaneously measuring the additional water required with such sand, said measuring device comprising a casing, partition dividing the casing into two chambers, means for allowing the water to pass from the upper chamber to the lower chamber and for preventing the admission of sand to the lower chamber and means for adjusting the ratio of the capacities of the two chambers.

3. A measure for measuring water and sand comprising a casing, a partition dividing the casing into two chambers, means whereby the water may pass to both chambers and the sand to only one of the chambers, and means for adjusting the capacity of both chambers.

4. A measure for measuring water and sand comprising a casing, a partition dividing the casing into two chambers, means whereby the water may pass to both chambers and the sand to only one of the chambers, and means for adjusting the capacity of each of the chambers.

5. A measure for measuring a liquid and a solid comprising a casing, a partition dividing the casing into two chambers, and trap means to allow the liquid to pass to both chambers and to intercept the solid to prevent its passage to one of the chambers.

6. A measure for measuring water and sand comprising a casing, a partition dividing the casing into two chambers, and a sand trap forming a part of the partition and allowing water to pass to both chambers but preventing the passage of sand to one of the chambers.

7. A measure for measuring water and sand comprising a casing, a partition dividing the casing into two chambers, an opening in the partition connecting the chambers, a bell covering the opening and spaced therefrom, and cooperating flanges on the partition and bell forming a sand trap to allow the passage of water to both chambers and prevent the passage of sand to one of the chambers.

8. A measure for measuring water and sand comprising a casing, a partition dividing the casing into two chambers, an opening in the partition connecting the two chambers, a bell extending over the opening and spaced therefrom, a flange on the partition about said opening and extending toward the bell, and a flange on the bell extending downwardly outside the partition flange and below the upper end thereof.

9. A measure for measuring water and sand comprising a casing, a partition dividing the casing into two chambers, an opening in the partition connecting the two chambers, a bell extending over the opening and spaced therefrom, a flange on the partition about said opening and extending toward the bell, and a peripheral flange on the bell extending downwardly outside the partition flange and below the upper end thereof.

10. A measure for measuring water and sand comprising a casing, partition means dividing the casing into two chambers, a sand trap forming a part of the partition means, and a valved aperture in the partition means.

11. A measure for measuring water and sand comprising a casing, a partition dividing the casing into two chambers, an opening in the partition connecting the chambers, a bell covering the opening and spaced therefrom, cooperating flanges on the partition and bell forming a sand trap to allow passage of water to both chambers and prevent passage of sand to one of the chmbers, and a valved aperture in the bell.

12. A measure for measuring water and sand comprising a casing, a partition dividing the casing into a water chamber and a sand chamber, means whereby water may pass to both chambers and sand to only one of the chambers, and a vacuum breaker on the water chamber.

In testimony whereof, I have hereunto set my hand.

GUSTAV E. ESCHER.